United States Patent
Formenti et al.

(10) Patent No.: US 6,812,671 B2
(45) Date of Patent: Nov. 2, 2004

(54) METHOD AND APPARATUS FOR CONTROLLING CURRENT DRAW WHILE CHARGING A BATTERY ARRAY

(75) Inventors: Jose Antonio Vieria Formenti, Allen, TX (US); Garry Ross Elder, Rowlett, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/376,353

(22) Filed: Feb. 26, 2003

(65) Prior Publication Data

US 2003/0222620 A1 Dec. 4, 2003

Related U.S. Application Data

(63) Continuation of application No. 10/159,138, filed on May 30, 2002, now Pat. No. 6,700,350.

(51) Int. Cl.⁷ .................. H01M 10/44; H01M 10/46
(52) U.S. Cl. ................................. 320/119; 320/130
(58) Field of Search ...................... 320/128, 130, 320/110, 116, 118, 119, 120, 122, 134, 135, 136

(56) References Cited

U.S. PATENT DOCUMENTS

| | | | | |
|---|---|---|---|---|
| 5,777,456 A | * | 7/1998 | Kern | 320/128 |
| 5,889,387 A | * | 3/1999 | Massie | 320/145 |
| 6,700,350 B2 | * | 3/2004 | Formenti et al. | 320/119 |

* cited by examiner

Primary Examiner—Edward H. Tso
(74) Attorney, Agent, or Firm—W. Daniel Swayze, Jr.; W. James Brady; Frederick J. Telecky, Jr.

(57) ABSTRACT

An apparatus for use with a charge control system for affecting current draw from a charging unit coupled at an input locus of the charge control system for charging a battery unit includes a current sink switchingly coupled with the input locus for selectively contributing a predetermined current draw at the input locus. A method for selectively establishing a predetermined current draw from a charging unit coupled at an input locus with a charge control unit for charging a battery unit includes the steps of: (a) providing a current sink switchingly coupled with the input locus; (b) sensing at least one predetermined condition in the battery unit; and (c) switchingly engaging the current sink when the at least one predetermined condition satisfies at least one predetermined criteria.

15 Claims, 7 Drawing Sheets

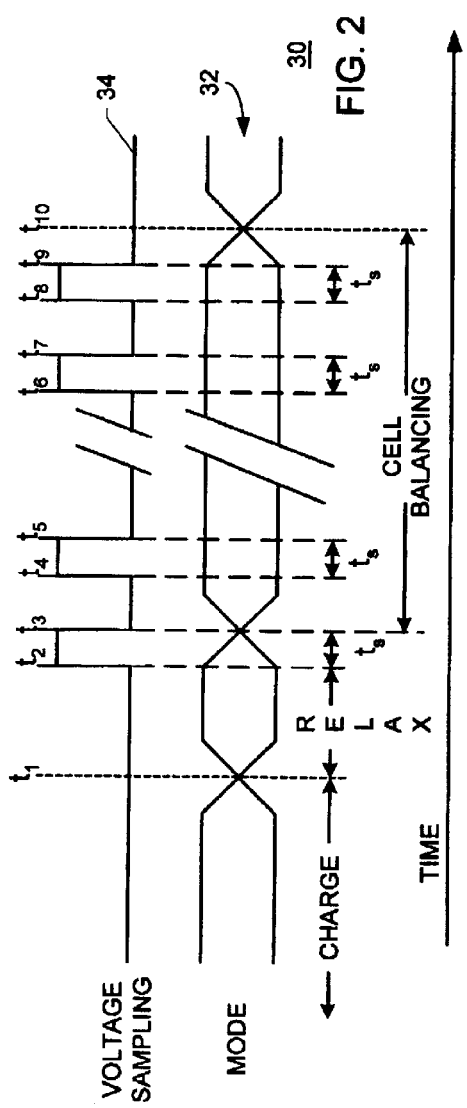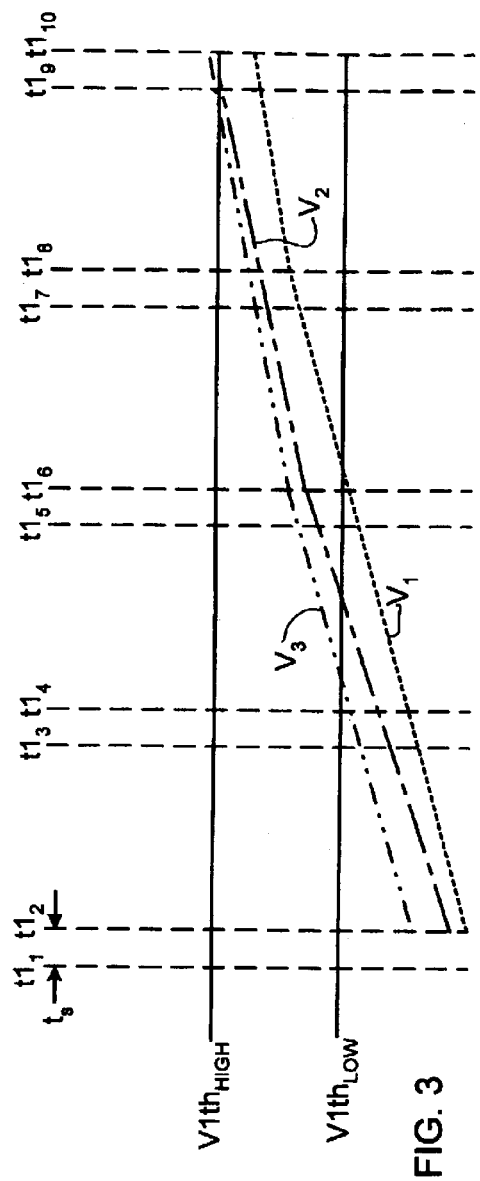

METHOD AND APPARATUS FOR CONTROLLING CURRENT DRAW WHILE CHARGING A BATTERY ARRAY

This is a continuation of application U.S. Ser. No. 10/159,138, filed May 30, 2002 now U.S. Pat. No. 6,700,350.

BACKGROUND OF THE INVENTION

The present invention is directed to battery charging methods and apparatuses, and especially to charging battery arrays having a plurality of battery cells. In particular, the present invention is useful in connection with balancing individual cells while charging multiple cell battery arrays, including Lithium-ion or Lithium polymer battery packs.

Many systems use batteries that are configured as battery packs or arrays including a plurality of individual battery cells coupled in series. Such a configuration is commonly encountered, for example in systems that need to maximize run time and use Li-ion (Lithium ion) or Li-polymer chemistry. The battery arrays may include two cells (e.g., for consumer products such as camcorders or cameras) up to four or more cells (e.g., for high-end notebook computers). In multi-cell battery arrays such as Li-ion battery packs with cells arranged in series the overall battery pack coulombmetric capacity is limited by the least capacity cell. As a result, energy capacity of a battery pack is dependent upon how closely individual cell voltages are matched. Cell mismatches of 100 mv (millivolts) can decrease battery pack energy capacity by more than 10%.

Such cell mismatches can be introduced during fabrication or during the processes of charging and discharging the battery array. Cell factory manufacturing can be as closely controlled as to produce capacity differences among cells in a battery array within 50 mv for Li-ion cells. However, cell imbalance or mismatch may be introduced by a number of factors independent of initial factory matching. Those factors contributing to cell imbalance include, by way of example, variations in individual cell chemistry, cell impedance, self discharge rates, capacity fade, operating temperature and other variations among respective individual cells. Cell temperature mismatches are a significant cause of cell mismatching that is a relatively common trait for densely packed products having multiple individual heat sources located close to the battery pack. For example, a 20° C. temperature mismatch can cause a voltage differential among cells as high as 100 mv in a charge cycle. One example of such a product is a notebook computer.

Because of the various problems resulting from cell mismatches, cell balancing while charging a battery pack is an important factor in maximizing battery pack energy capacity. Two methods are currently used to balance cells during charging battery packs having multiple cells.

One method presently in use involves differential cell measurement. Using differential cell measurement, individual cell voltages are sampled and differential cell voltages are calculated during charging. When a high differential voltage is detected, charging is interrupted and individual cells are selectively discharged appropriately to obtain balance among cells. This differential cell measurement approach facilitates accurate cell balancing, but complex circuitry and methodology are required to practice the method. For example, it is necessary to use cell voltage translation, A/D (analog-to-digital) conversion and multiple arithmetic operations to practice differential cell measurement. Because of the complexity of the equipment and calculations required for practicing the method, differential cell measurement is usually found to be employed for cell balancing in high-end, high-cost products that include an analog front-end IC (integrated circuit) for measuring voltages in cooperation with a microcontroller or CPU (central processing unit)—based evaluating system.

A second method presently used to balance cells during charging battery packs having multiple cells is a ground referenced, fixed threshold method. Using such a fixed threshold method, when one cell reaches a first predetermined threshold it is discharged to a lower second threshold. The second threshold is usually a fixed threshold set to a voltage equal to or greater than the target voltage, or regulated voltage for the battery pack. The fixed threshold method is less expensive to equip and practice than the differential cell measurement method described above, but it can suffer from low accuracy and can require significantly longer charge times than may be experienced using a differential cell measurement method described above. The likelihood for longer charge times is particularly high if initial voltage mismatch among cells is large.

In both the differential cell measurement method and the fixed threshold method, a charger on the system side must be controlled by the host product it is charging in the battery pack in order to prevent false termination of charging during sampling or cell balancing intervals.

There is a need for a low cost accurate cell balancing method that does not significantly lengthen charge times.

There is a particular need for such a low cost cell balancing method that does not require control by or communication with the host device being charged.

There is also a need for a charge control apparatus that can operate without requiring control by or communication with the host device in the battery pack being charged and can permit cell balancing without causing false termination of charging operations.

SUMMARY OF THE INVENTION

A method for controlling voltage levels among cells while charging a battery array to a target voltage uses cell balancing modes employing respective charging currents. The method includes the steps of: (a) In no particular order: (1) establishing a parametric criterion for identifying each cell balancing mode; (2) identifying a performance parameter associated with selected cells for each cell balancing mode; and (3) establishing an exit criterion for each cell balancing mode; (b) ascertaining the onset of charging; (c) identifying the extant cell balancing mode; (d) employing the charging current for the extant cell balancing mode for cell balancing; (e) for selected cells: (1) obtaining an extant parameter associated with the cell; (2) comparing each extant parameter with the exit criterion; and (3) repeating steps (e)(1) through (e)(2) until the extant parameter satisfies the exit criterion; (f) terminating the extant cell balancing mode; (g) repeating steps (c) through (f) until the target voltage is achieved; (h) terminating charging.

It is, therefore, an object of the present invention to provide a system and method for controlling cell balancing of a battery array that is inexpensive, accurate and does not significantly lengthen charge times.

It is a further object of the present invention to provide a system and method for controlling cell balancing of a battery array that can permit cell balancing without causing false termination of charging operations.

Further objects and features of the present invention will be apparent from the following specification and claims

BRIEF DESCRIPTION OF THE DRAWINGS

FIG. 2 is a schematic diagram illustrating representative cell balancing steps employed in carrying out the method of the present invention.

FIG. 3 is a graphic diagram illustrating cell voltage as a function of time in a representative practicing of the method of present invention for cell balancing a battery array in a first cell balancing mode as illustrated in FIG. 1.

DETAILED DESCRIPTION OF THE PREFERRED EMBODIMENT

Figure 1:
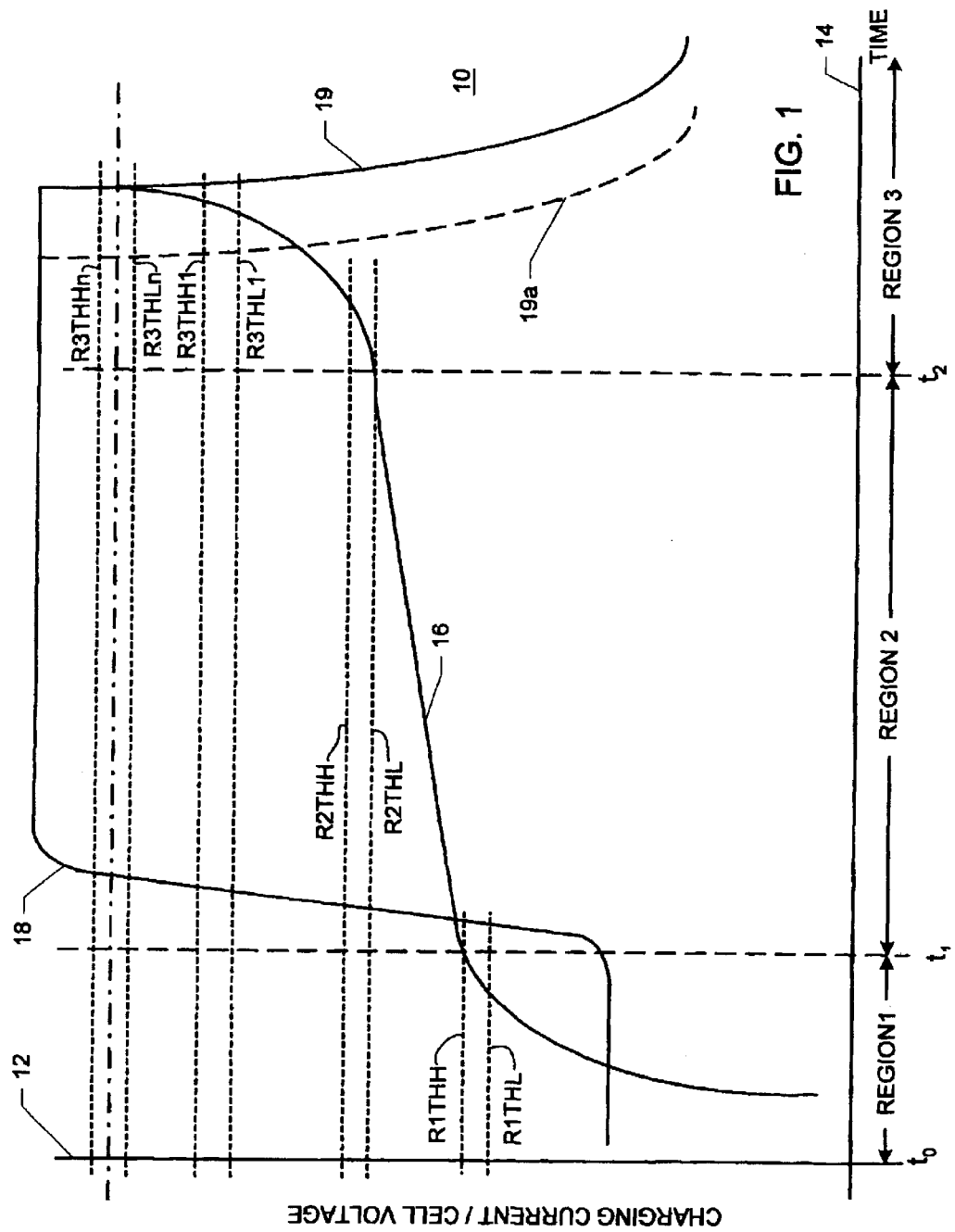
FIG. 1 is a graphic diagram of a representative charging evolution illustrating charging current and cell voltage as they relate to time, and providing an overview of the method of the present invention.

FIG. 1 is a graphic diagram of a representative charging evolution illustrating charging current and cell voltage as they relate to time, and providing an overview of the method of the present invention. In FIG. 1, a graphic plot 10 is presented with a first axis 12 representing charging current/cell voltage, and a second axis 14 representing time. A curve 16 represents cell voltage (for a representative cell in a multi cell battery array) as a function of time. A curve 18 represents charging current as a function of time. Curve 18 has a taper section 19 representing the portion of the charge cycle during which charging current markedly decreases while cell voltage markedly increases. Two taper sections 19, 19a represent such a tapering effect for two representative cells in a battery array.

Graphic plot 10 is segmented into three regions: Region 1, Region 2, and Region 3. Region 1 spans a time interval from time to $t_0$ time $t_1$. Region 2 spans a time interval from time $t_1$ to time $t_2$. Region 3 spans times from time $t_2$ to later times. Region 1 represents a portion of a charging cycle during which the battery array is substantially depleted and has very little or no charge. In Region 1 cell dV/dQ (change of voltage per change of charge) is at a maximum, cell voltage (curve 16) is rising significantly and charging current (curve 18) is at a minimum level. Region 2 represents a portion of a charging cycle during which the battery array has a medium charge level. In Region 2 cell dV/dQ is minimal, cell voltage (curve 16) rises slightly to moderately and charging current (curve 18) is at a maximum level. Region 2 is the main charge time duration of the representative charge cycle of a battery array represented by graphic plot 10. Region 3 represents a portion of a charging cycle during which the battery array has a high charge level. In Region 3, cell dV/dQ is at a maximum, and charging current (curve 18) begins to decrease as soon as a cell reaches its respective target voltage (or regulation voltage; or regulated voltage). Such a decrease is indicated in FIG. 1 in taper section 19 for one cell of the battery array being charged, and is indicated in taper section 19a for a second cell of the battery array being charged.

The respective durations of Region 1 (interval $t_0$–$t_1$), Region 2 (interval $t_1$–$t_2$) and Region 3 (interval $t_2$ to later times) depend upon the charge level of the battery (or battery pack) being charged. Thus, one can lengthen the duration of a charge operation, or the interval of Region 1, Region 2 or Region 3, by varying the charge state of the battery pack being charged. Adjustment of respective charge states of various battery cells in a battery pack is employed to achieve balancing among respective battery cells, but may also lengthen the overall time-to-charge experienced in bringing the battery pack to a fully charged state.

A common approach to balanced charging involves performing cell sampling during charging to ascertain which cells are mismatched, and discharging selected cells to reduce the cell mismatches that are identified during sampling. Carrying out such cell sampling and discharge operations while applying full charge current to the battery array (e.g., in Region 2; FIG. 1) does not provide effective cell balancing. This is so because, the voltage measured across a cell includes a voltage portion contributed by the impedance of the cell being evaluated, plus the intrinsic cell voltage. Impedance mismatches among individual cells are common and those mismatches will contribute to errors in measured voltages for cells. A better practice that yields more accurate cell voltage measurements is to perform cell sampling and discharge operations after suspending or interrupting the charge current. Thus, the charge operation is interrupted for a period to permit sampling of cells and selective discharge among cells to reduce mismatches discovered during sampling. Such a suspension of charging eliminates cell impedance contribution to cell voltage measurements and yields more accurate indications of cell mismatches. A problem arises in charging systems in which a charger is not aware that a charge is intentionally interrupted, for example in systems in which the host device being charged does not communicate with the charger. In such a situation the charger may detect a taper current (e.g., taper sections 19, 19a; FIG. 1) or a battery open condition which will cause the charger to prematurely and erroneously terminate the charge.

FIG. 1 illustrates the relationships among charging current, charge voltage and time in charging a battery. The delineation of Region 1, Region 2 and Region 3 in terms of time intervals presumes that, for example, one uninterruptedly applies a charging current to a battery to charge the battery. The advantage provided by the method of the present invention is illustrated in overview in FIG. 1. An important feature of the method of the present invention is to effect cell balancing among cells in a battery array before proceeding from one of Region 1, Region 2, Region 3 to another of Region 1, Region 2, Region 3. That is, the driving impetus in practicing the preferred embodiment of the method of the present invention is not time nor is it charging current. The driving impetus in practicing the preferred embodiment of the method of the present invention is to achieve a predetermined degree of balance among cells in the battery array in one of Region 1, Region. 2, Region 3 before proceeding to the next region of Region 1, Region 2, Region 3.

Thus, according to the preferred embodiment of the method of the present invention there are thresholds established for use in determining whether sufficient balance is achieved among cells before proceeding to a next region of Region 1, Region 2, Region 3. The thresholds are preferably voltage thresholds that are treated using a cell balancing algorithm for determining whether desired balance is achieved among cells. The present invention contemplates that different cell balancing algorithms may be employed in different regions for effecting the desired cell balancing.

In Region 1, a lower Region 1 voltage threshold R1THL and a higher Region 1 voltage threshold R1THH are established. In Region 2, a lower Region 2 voltage threshold R2THL and a higher Region 2 voltage threshold R2THH are established. In Region 3, as will be described in greater detail later in connection with FIG. 5, voltage thresholds may be dynamically shifted in order to come closer to achieving regulated voltage for all cells in the battery array. Thus, in Region 3 a first lower Region 3 voltage threshold R3THL1 and a first higher Region 3 voltage threshold R3THH1 are established. Region 3 voltage thresholds R3THL1, R3THH1 can be iteratively dynamically shifted during charging a plurality of times, as indicated by there also being established an nth lower Region 3 voltage threshold R3THLn and an nth higher Region 3 voltage threshold R3THHn. The use of the term "n" is intended to indicate that there is no particular limit to the number of iterative establishings for Region 3 voltage thresholds R3THLn, R3THHn in practicing the method of the present invention. Of course, one may consider that time of charge is a parameter of importance. In such a situation, one may limit the number of iterative establishings for Region 3 voltage thresholds R3THLn, R3THHn by some means, such as limiting "n" to a predetermined number, by providing a time limit for moving on to a subsequent method step, or by another means.

The method of the present invention provides that one satisfy predetermined criteria for selected cells of the battery array (preferably, for all cells in the battery array) vis-à-vis Region 1 voltage thresholds R1THL, R1THH before selecting a cell balancing method (curve 18; FIG. 1) to operate in Region 2. The cell balancing algorithm that is employed to seek cell balancing effectively controls the load seen by the charger. This effectively controlling of load seen by the charger is carried out by effecting slower charging of selected cells while permitting other cells to continue to be charged at a higher charge rate. That is, the cell balancing algorithm configures the load seen by the charger in a manner that causes the charger to continue to see a state of charge in the battery cell array that is to be treated using charging current as it is applied in Region 1 or to see a state of charge in the battery cell array that is to be treated using charging current as it is applied in Region 2.

Similarly, one employs a cell balancing algorithm (not necessarily the same cell balancing algorithm as is used in connection with Region 1) to achieve predetermined criteria for selected cells of the battery array (preferably, for all cells in the battery array) vis-à-vis Region 2 voltage thresholds R2THL, R2THH before selecting a cell balancing method to operate in Region 3. Further, one employs a cell balancing algorithm (not necessarily the same cell balancing algorithm as is used in connection with Region 1 or Region 2) to achieve predetermined criteria for selected cells of the battery array (preferably, for all cells in the battery array) vis-à-vis Region 3 voltage thresholds R2THLn, R3THHn before terminating the cell balancing FIG. 2 is a schematic diagram illustrating representative charging steps employed in carrying out the method of the present invention. In FIG. 2, a time line 30 illustrates occurrence in time of steps or modes 32 in a charging process, and variation in time of a voltage sampling signal 34. The charging process illustrated in FIG. 2 is engaged in a charge step from before the earliest time illustrated in FIG. 2 until a time $t_1$. At time $t_1$ the charge process enters a relax step. During the relax step the charger is not applying fast charge current (curve 18; FIG. 1) to the battery array in order that any charging current may dampen to substantially zero. In such manner, one avoids introducing error into measuring cell mismatches from the charging current traversing respective cell impedance, as discussed earlier in connection with FIG. 1. Voltage sampling signal 34 is pulsed during the interval $t_2$–$t_3$ for a sampling interval having a duration $t_s$, effecting sampling of cell voltage at time $t_3$. At time $t_3$, with cell sampling complete, the charge process enters a cell balancing step. The cell balancing step occupies a time interval $t_3$–$t_{10}$. Voltage sampling signal 34 is pulsed during intervals $t_4$–$t_5$, $t_6$–$t_7$, $t_8$–$t_9$ (each interval having a duration $t_s$) to effect voltage sampling in support of the cell balancing step then extant at times $t_5$, $t_7$, $t_9$. The charge process enters another step at time $t_{10}$, preferably another charge step.

FIG. 3 is a graphic diagram illustrating cell voltage as a function of time in a representative practicing of the method of present invention for charging a battery array in a first charging mode as illustrated in FIG. 1. FIG. 3 is a representation of a preferred application of the method of the present invention in Region 1 (FIG. 1). In FIG. 3, voltages in three cells in a battery array are illustrated as they vary with respect to time. A first cell (Cell 1) exhibits a cell voltage $V_1$, a second cell (Cell 2) exhibits a cell voltage $V_2$ and a third cell (Cell 3) exhibits a cell voltage $V_3$ over a time interval $t1_1$–$t1_{10}$. None of cells Cell 1, Cell 2, Cell 3 are shown in FIG. 3.

The preferred embodiment of the method of the present invention begins with, in no particular order, establishing a parametric criterion for identifying the respective cell balancing mode, identifying at least one performance parameter associated with the cells and establishing an exit criterion related to the performance parameter. In the situation illustrated in FIG. 3, the performance parameter is established as a lower cell voltage threshold $V1th_{LOW}$ and an upper cell voltage threshold $V1th_{HIGH}$. The charge process is identified as being in Region 1 (FIG. 1) by cell voltages $V_1$, $V_2$, $V_3$ being less than upper cell voltage threshold $V1th_{HIGH}$. A voltage sampling signal (e.g., voltage sampling signal 34; FIG. 2) periodically samples cell voltages $V_1$, $V_2$, $V_3$ during sample intervals of duration $t_s$ effective at times $t1_2$, $t1_4$, $t1_6$, $t1_8$, $t1_{10}$. In the exemplary application of the method of the present invention illustrated in FIG. 3, at the end of each sampling period $t_s$ a decision is made which cells should be charged more slowly: any cell having a cell voltage greater than lower cell voltage threshold $V1th_{LOW}$ is charged at a slower rate in order to reduce mismatch among cells. One structure for effecting selective slower charging among cells is to provide selectively established current paths for rerouting a portion of current around a selected cell. If there is no charging current applied when the circuit is configured to redirect current around selected cells, then the selected cells will discharge. Thus, none of the cells (Cell 1, Cell 2, Cell 3) are candidates for slower charging at sampling times $t1_2$, $t1_4$. At sampling time $t1_6$ cell voltages $V_2$, $V_3$ are both above lower cell voltage threshold $V1th_{LOW}$ and therefore cells Cell 2, Cell 3 are charged more slowly, as is indicated by the lesser slope of curves representing cell voltages $V_2$, $V_3$ from sampling time $t1_6$ onward to time $t1_{10}$. Cell voltage $V_1$ is not detected as exceeding lower cell voltage threshold $V1th_{LOW}$ until sampling time t1$_8$, after which time cell Cell 1 is charged more slowly, as is indicated by the lesser slope of the curve representing cell voltage V$_1$ from sampling time t1$_8$ onward to time t1$_{10}$.

A representative exit criterion for the charge mode illustrated in FIG. 3 provides that Region 1 may be exited when any cell voltage V$_1$, V$_2$, V$_3$ exceeds upper cell voltage threshold V1th$_{HIGH}$. At sample time t1$_{10}$ cell voltage V$_3$ exceeds upper cell voltage threshold V1th$_{HIGH}$, so the cell balancing operation illustrated in FIG. 3 ceases and charging continues. Using this representative exit criteria it is possible that the cell balancing operation may cease before complete balancing is achieved among battery cells. This may be permitted in order to avoid too much delay in charging operations. Alternate exit criteria, or an alternate charge balancing algorithm or a combination of alternate exit criteria and an alternate charge balancing algorithm may be substituted for the representative criteria and balancing algorithm discussed here in order to assure that complete cell balancing is achieved before permitting the cell balancing operation to cease. Alternatively, a time limit may be imposed to establish a time out period as an additional exit criterion. In such a case, if the time out period expires, the cell balancing operation ceases regardless of whether any cell voltage V$_1$, V$_2$, V$_3$ has exceeded upper cell voltage threshold V1th$_{HIGH}$.

Figure 4:
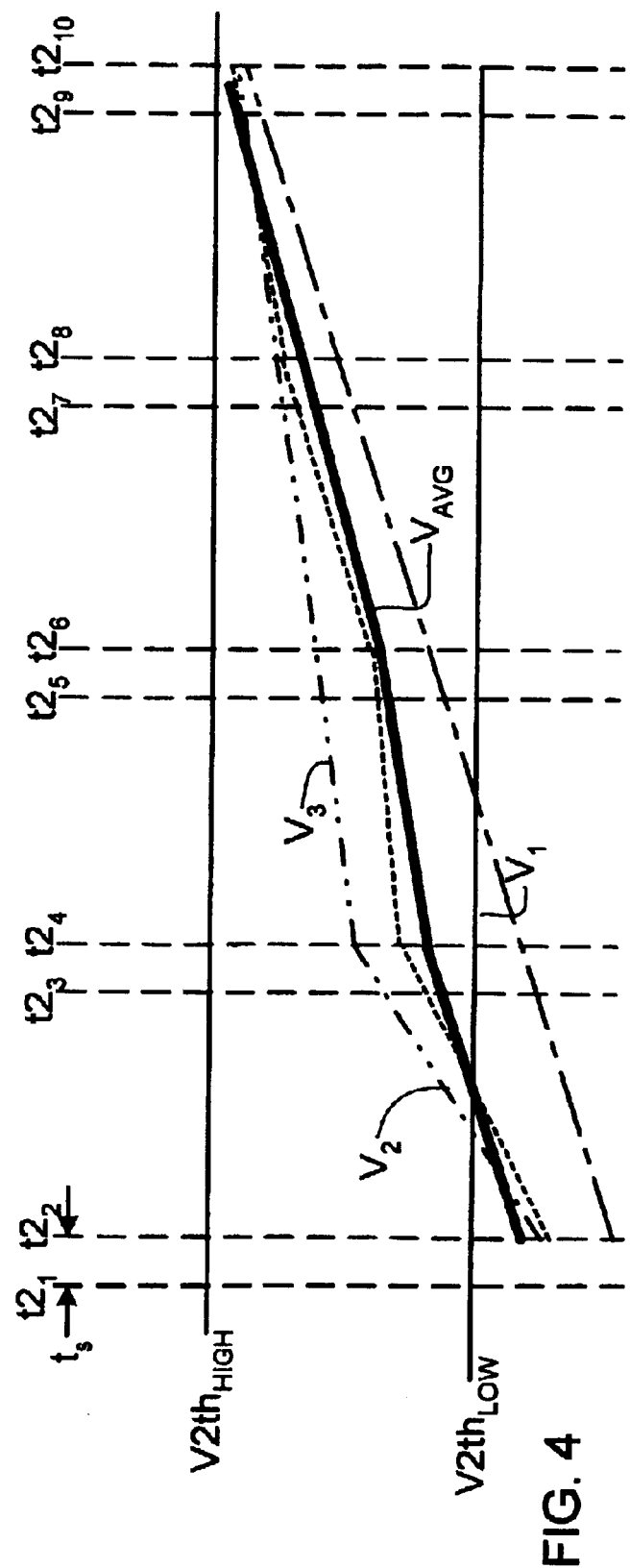
FIG. 4 is a graphic diagram illustrating cell voltage as a function of time in a representative practicing of the method of present invention for balancing cells in a battery array in a second charging mode as illustrated in FIG. 1.

FIG. 4 is a graphic diagram illustrating cell voltage as a function of time in a representative practicing of the method of present invention for charging a battery array in a second charging mode as illustrated in FIG. 1. FIG. 4 is a representation of a preferred application of the method of the present invention in Region 2 (FIG. 1). In FIG. 4, voltages in three cells in a battery array are illustrated as they vary with respect to time. A first cell (Cell 1) exhibits a cell voltage V$_1$, a second cell (Cell 2) exhibits a cell voltage V$_2$ and a third cell (Cell 3) exhibits a cell voltage V$_3$ over a time interval t2$_1$–t2$_{10}$. None of cells Cell 1, Cell 2, Cell 3 are shown in FIG. 4.

The preferred embodiment of the method of the present invention begins with, in no particular order, establishing a parametric criterion for identifying the respective cell balancing mode, identifying at least one performance parameter associated with the cells and establishing an exit criterion related to the performance parameter. In the situation illustrated in FIG. 4, the performance parameter is established as a lower cell voltage threshold V2th$_{LOW}$ and an upper cell voltage threshold V2th$_{HIGH}$. The charge process is identified as being in Region 2 (FIG. 1) by cell voltages V$_1$, V$_2$, V$_3$ being greater than upper cell voltage threshold V1th$_{HIGH}$ (FIG. 3). A voltage sampling signal (e.g., voltage sampling signal 34; FIG. 2) periodically samples cell voltages V$_1$, V$_2$, V$_3$ during sample intervals of duration t$_s$ effective at times t2$_2$, t2$_4$, t2$_6$, t2$_8$, t2$_{10}$. In the exemplary application of the method of the present invention illustrated in FIG. 4, at the end of each sampling period t$_s$ a decision is made which cells should be charged more slowly: any cell having a cell voltage greater than the average cell voltage V$_{AVG}$ is charged more slowly in order to reduce mismatch among cells. One structure for effecting selective slower charging among cells is to provide selectively established current paths for rerouting a portion of current around a selected cell. If there is no charging current applied when the circuit is configured to redirect current around selected cells, then the selected cells will discharge. Average cell voltage V$_{AVG}$ is calculated:

$$V_{AVG} = \frac{V_1 + V_2 + \ldots V_n}{N}$$

Where N=Number of Cells in Array

In the charge operation illustrated in FIG. 4, N=3. None of the cells (Cell 1, Cell 2, Cell 3) are candidates for slower charging at sampling time t2$_2$. At sampling time t2$_4$ cell voltages V$_2$, V$_3$ are both above average cell voltage threshold V$_{AVG}$ and therefore cells Cell 2, Cell 3 are charged more slowly, as is indicated by the lesser slope of curves representing cell voltages V$_2$, V$_3$ from sampling time t2$_4$ onward to time t2$_6$.

At sampling time t2$_6$ cell voltage V$_2$ is equal with average voltage V$_{AVG}$ and therefore cell Cell 2 commences charging at a faster rate, as indicated by the increased slope of the curve representing cell voltage V$_2$. Cell voltage V$_3$ remains higher than average voltage V$_{AVG}$ at sampling time t2$_6$, and therefore cell Cell 3 continues to be charged more slowly. At sampling time t2$_8$ cell voltages V$_2$, V$_3$ are both higher than average voltage V$_{AVG}$. Thus cell Cell 3 continues to be charged more slowly, and cell Cell 2 again commences charging more slowly. Cell voltage V$_1$ is not detected as exceeding average cell voltage V$_{AVG}$ and cell Cell 1 is therefore not affected. A representative exit criterion for the charge operation illustrated in FIG. 4 provides that Region 2 may be exited when all cell voltages V$_1$, V$_2$, V$_3$ exceed upper cell voltage threshold V2th$_{HIGH}$. At sample time t2$_{10}$ none of cell voltages V$_1$, V$_2$, V$_3$ exceeds upper cell voltage threshold V2th$_{HIGH}$, so the cell balancing operation illustrated in FIG. 4 continues. The load seen by the charger is kept at a current level that indicates to the charger that cell balancing operations in Region 2 should continue, and the charge operation is longer than it would have been without cell balancing in Region 2. This is an example of the dynamic nature of the method of the present invention by which transition from one charging mode (e.g., Region 1, Region 2, Region 3; FIG. 1) to another charging mode is not driven by time but rather by a real-time evaluation of conditions in the cells of the array.

Using this representative exit criteria it is possible that the cell balancing operation may cease before complete balancing is achieved among battery cells. This may be permitted in order to avoid too much delay in charging operations. Alternate exit criteria, or an alternate charge balancing algorithm or a combination of alternate exit criteria and an alternate charge balancing algorithm may be substituted for the representative criteria and balancing algorithm discussed here in order to assure that complete cell balancing is achieved before permitting the cell balancing operation to cease. Alternatively, a time limit may be imposed to establish a time out period as an additional exit criterion. In such a case, if the time out period expires, the cell balancing operation ceases regardless of whether all cell voltages V$_1$, V$_2$, V$_3$ have exceeded upper cell voltage threshold V2th$_{HIGH}$.

Figure 5:
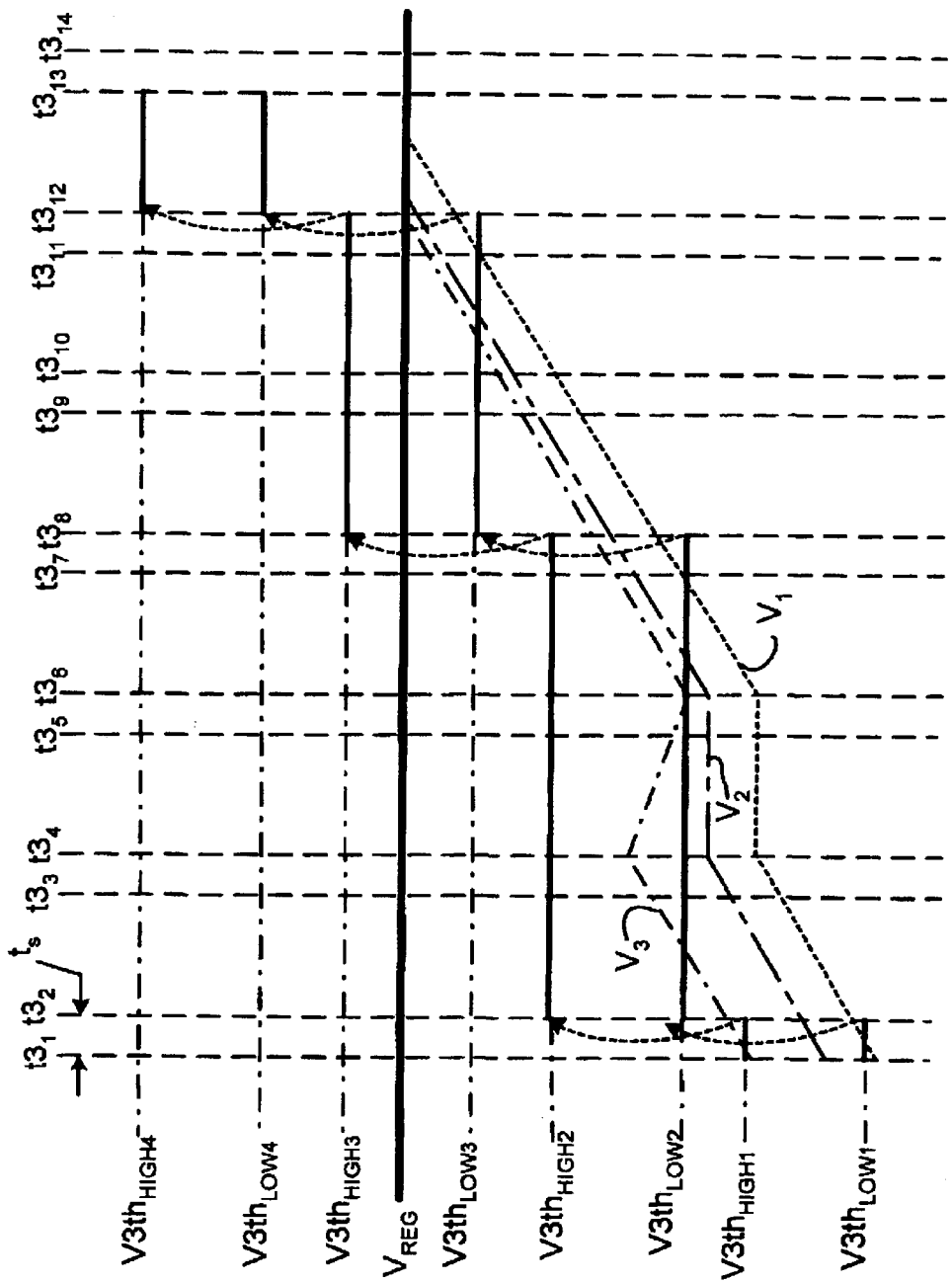
FIG. 5 is a graphic diagram illustrating cell voltage as a function of time in a representative practicing of the method of present invention for cell balancing a battery array in a third cell balancing mode as illustrated in FIG. 1.

FIG. 5 is a graphic diagram illustrating cell voltage as a function of time in a representative practicing of the method of present invention for charging a battery array in a third charging mode as illustrated in FIG. 1. FIG. 5 is a representation of a preferred application of the method of the present invention in Region 3 (FIG. 1). In FIG. 5, voltages in three cells in a battery array are illustrated as they vary with respect to time. A first cell (Cell 1) exhibits a cell voltage V$_1$, a second cell (Cell 2) exhibits a cell voltage V$_2$ and a third cell (Cell 3) exhibits a cell voltage V$_3$ over a time interval t3$_1$–t3$_{14}$. None of cells Cell 1, Cell 2, Cell 3 are shown in FIG. 5.

The preferred embodiment of the method of the present invention begins with, in no particular order, establishing a parametric criterion for identifying the respective cell balancing mode, identifying at least one performance parameter associated with the cells and establishing an exit criterion related to the performance parameter. In the situation illustrated in FIG. 5, the performance parameter is initially established as a first lower cell voltage threshold $V3th_{LOW1}$ and a first upper cell voltage threshold $V3th_{HIGH1}$. The charge process is identified as being in Region 3 (FIG. 1) because all cell voltages $V_1$, $V_2$, $V_3$ are greater than upper cell voltage threshold $V2th_{HIGH}$ (FIG. 4). A voltage sampling signal (e.g., voltage sampling signal 34; FIG. 2) periodically samples cell voltages $V_1$, $V_2$, $V_3$ during sample intervals of duration $t_s$ effective at times $t3_2$, $t3_4$, $t3_6$, $t3_8$, $t3_{10}$, $t3_{12}$, $t3_{14}$. In the exemplary application of the method of the present invention illustrated in FIG. 5, at the end of each sampling period $t_s$ certain decisions are made regarding treatment of various cells. A two-step evaluation is performed: (1) If any cell voltage $V_n$ is greater than the then extant upper cell voltage threshold $V3th_{HIGHn}$ then the thresholds $V3th_{LOWn}$, $V3th_{HIGHn}$ are shifted higher to new thresholds $V3th_{LOWnew}$, $V3th_{HIGHnew}$ at levels where all cell voltages $V_n$ are less than new upper cell voltage threshold $V3th_{HIGHnew}$. Further evaluation is effected with respect to the new higher thresholds $V3th_{LOWnew}$, $V3th_{HIGHnew}$. If no cell voltage $V_n$ is greater than the then extant upper cell voltage threshold $V3th_{HIGHnew}$ then the thresholds $V3th_{LOWnew}$, $V3th_{HIGHnew}$ remain at their then extant levels and further evaluation is effected with respect to the unchanged thresholds. (2) If a respective cell voltage $V_n$ is greater than the then extant lower cell voltage threshold $V3th_{LOWnew}$ (after the threshold evaluations have been made pursuant to step (1) above) then the respective cell Cell n displaying the voltage $V_n$ is charged more slowly. One structure for effecting selective slower charging among cells is to provide selectively established current paths for rerouting a portion of current around a selected cell. If there is no charging current applied when the circuit is configured to redirect current around selected cells, then the selected cells will discharge. A further evaluation is also employed: (3) If all cells Cell 1, Cell 2, Cell 3 have cell voltages $V_1$, $V_2$, $V_3$ between then extant thresholds $V3th_{LOWn}$, $V3th_{HIGHn}$ it is assumed that cells Cell 1, Cell 2, Cell 3 are balanced. Under such assumed balanced circumstances (a) a full charge is effected to charge all of cells Cell 1, Cell 2, Cell 3 as fast as possible; and (b) thresholds $V3th_{LOWn}$, $V3th_{HIGHn}$ are shifted higher to new thresholds at levels where all cell voltages $V_n$ are less than new upper cell voltage threshold $V3th_{HIGHnew}$. Further, if any of the cell voltages $V_1$, $V_2$, $V_3$ is between then extant thresholds $V3th_{LOWn}$, $V3th_{HIGHn}$ and another cell voltage $V_1$, $V_2$, $V_3$ remains below lower extant threshold $V3th_{LOWn}$, then the cell voltage $V_1$, $V_2$, $V_3$ that is between then extant thresholds $V3th_{LOWn}$, $V3th_{HIGHn}$ is discharged (for example, no charging current is applied to the affected cell and an alternate current path redirecting circuitry around the affected cell is enabled or established), and the extant charge is maintained on the cells having a cell voltage $V_1$, $V_2$, $V_3$ below then extant lower threshold $V3th_{LOWn}$. Still further, if all cell voltages $V_1$, $V_2$, $V_3$ are below lower extant threshold $V3th_{LOWn}$, then all cell voltages $V_1$, $V_2$, $V_3$ are charged at the fast charge rate together.

At sampling time $t3_2$, cell voltage $V_3$ is greater than the then extant upper cell voltage threshold $V3th_{HIGH1}$ so thresholds $V3th_{LOW1}$, $V3th_{HIGH1}$ are shifted to higher levels sufficiently to establish new thresholds $V3th_{LOW2}$, $V3th_{HIGH2}$ at levels where all cell voltages $V_1$, $V_2$, $V_3$ are less than new upper cell voltage threshold $V3th_{HIGH2}$. Then cell voltages $V_1$, $V_2$ are below the then extant lower cell voltage threshold $V3th_{LOW2}$ so that no slower charging is effected for cells Cell 1, Cell 2 having cell voltages $V_1$, $V_2$.

At sampling time $t3_4$ cell voltage $V_3$ is greater than extant lower cell voltage threshold $V3th_{LOW2}$, but cell voltages $V_2$, $V_3$ are below lower voltage threshold $V3th_{LOW2}$, so cell Cell 3 is discharged and cells Cell 2, Cell 3 are maintained at their respective voltage levels, as manifested in FIG. 5 by a downward slope for the curve representing cell voltage $V_3$ from sampling time $t3_4$ onward. At sampling time $t3_4$ cell voltages $V_1$, $V_2$ are both below lower cell voltage threshold $V3th_{LOW2}$ so the then extant charge levels on cells Cell 1, Cell 2 are maintained, as manifested by the flat voltage levels for the curves representing cell voltages $V_2$, $V_3$ from sampling time $t3_4$ onward.

At sampling time $t3_6$ cell voltages $V_1$, $V_2$, $V_3$ remain below lower cell voltage threshold $V3th_{LOW2}$, so that all of cells Cell 1, Cell 2, Cell 3 are charged at the fast charge rate, as is indicated by the parallel curves representing cell voltages $V_1$, $V_2$, $V_3$ from sampling time $t3_6$ onward.

At sampling time $t3_8$ all cell voltages $V_1$, $V_2$, $V_3$ are between thresholds $V3th_{LOW2}$, $V3th_{HIGH2}$ so thresholds $V3th_{LOW2}$, $V3th_{HIGH2}$ are shifted to higher levels sufficiently to establish new thresholds $V3th_{LOW3}$, $V3th_{HIGH3}$ at levels where all cell voltages $V_1$, $V_2$, $V_3$ are less than new upper cell voltage threshold $V3th_{HIGH3}$. Cells Cell 1, Cell 2, Cell 3 continue at full charge.

At sampling time $t3_{10}$ all cell voltages $V_1$, $V_2$, $V_3$ are below then extant lower cell voltage threshold $V3th_{LOW3}$ and cells Cell 1, Cell 2, Cell 3 continue at full charge.

At sampling time $t3_{12}$ all cell voltages $V_1$, $V_2$, $V_3$ are between thresholds $V3th_{LOW3}$, $V3th_{HIGH3}$ so thresholds $V3th_{LOW3}$, $V3th_{HIGH3}$ are shifted to higher levels sufficiently to establish new thresholds $V3th_{LOW4}$, $V3th_{HIGH4}$ at levels where all cell voltages $V_1$, $V_2$, $V_3$ are less than new upper cell voltage threshold $V3th_{HIGH4}$. Cells Cell 1, Cell 2, Cell 3 continue at full charge.

At a time between sampling time $t3_{12}$ and time $t3_{13}$ all cell voltages $V_1$, $V_2$, $V_3$ achieve regulated voltage $V_{REG}$ (also know variously as rated voltage or target voltage). The method permits exiting or terminating cell balancing operations when an extant upper cell voltage threshold $V3th_{HIGHn}$ exceeds $V_{REG}$. That situation is present in FIG. 5 during the interval $t3_{12}$–$t3_{13}$. Accordingly, cell balancing is terminated at sampling time $t3_{14}$. Alternatively, a time limit may be imposed to establish a time out period as an additional exit criterion. In such a case, if the time out period expires, the cell balancing operation ceases in Region 3 and cell balancing is terminated regardless of whether an extant upper cell voltage threshold $V3th_{HIGHn}$ exceeds $V_{REG}$.

Figure 6:
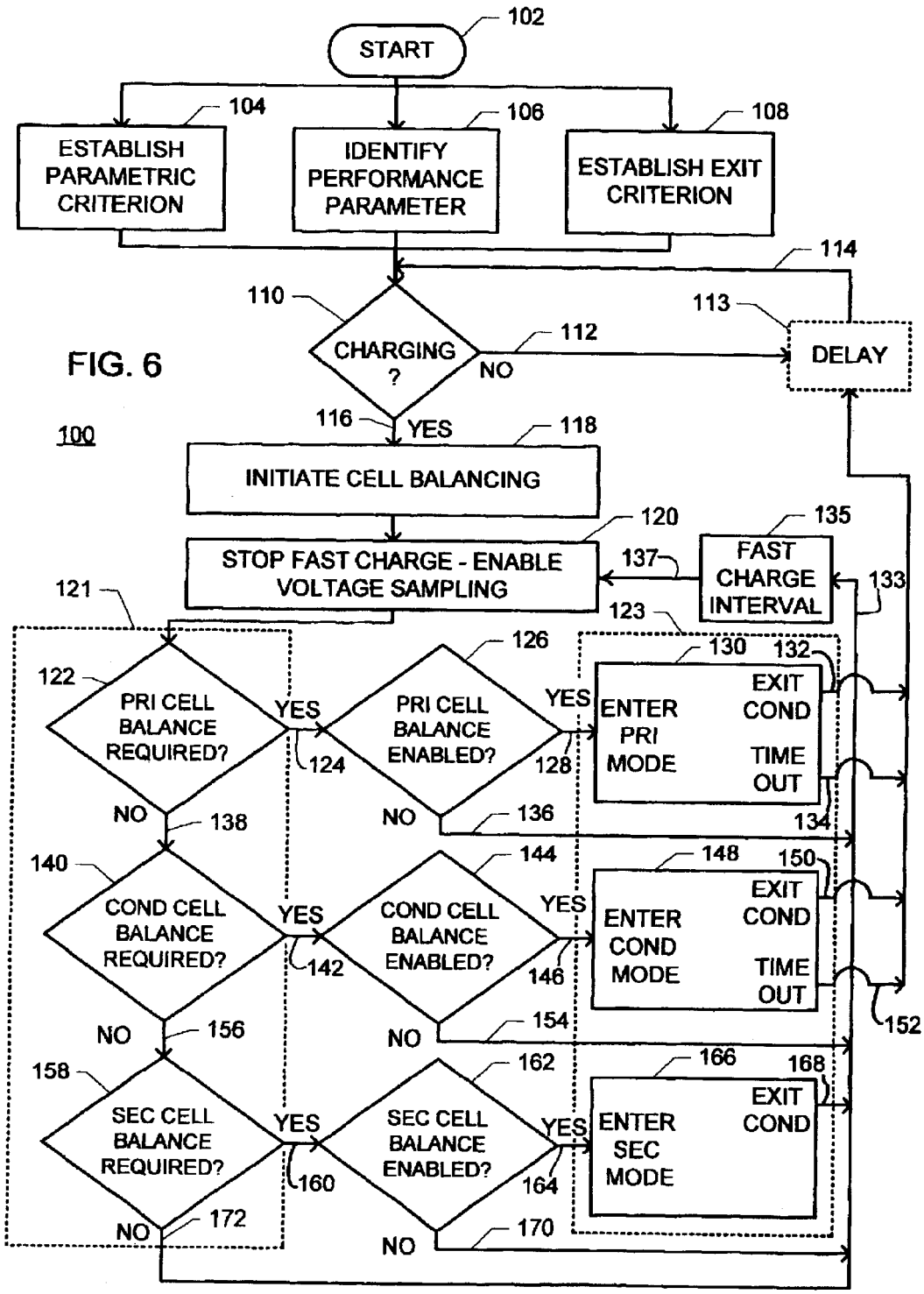
FIG. 6 is a flow diagram illustrating the preferred embodiment of the method of the present invention.

FIG. 6 is a flow diagram illustrating the preferred embodiment of the method of the present invention. In FIG. 6, a method 100 for controlling charging of a battery array having a plurality of cells begins at a Start locus 102. The charging is effected in a plurality of charging modes to achieve a substantially similar target voltage in a plurality of cells. Each respective charging mode of the plurality of charging modes employs at least one respective charging variable to effect the charging. Method 100 continues with the steps of, in no particular order, establishing at least one parametric criterion for identifying each respective cell balancing mode, as indicated by a block 104; identifying at least one performance parameter associated with selected cells of the plurality of cells for each respective cell balancing mode, as indicated by a block 106; and establishing at least one exit criterion for permitting exiting from each respective cell balancing mode, as indicated by a block 108. The at least one exit criterion indicates the at least one performance parameter is within a predetermined value range for each selected cell.

Method 100 continues by posing a query whether charging is being conducted, as indicated by a query block 110. If charging is not being conducted, method 100 continues via NO response line 112 to return to query block 110 via a return line 114. A delay 113 may be if desired imposed in returning to query block 110. The optional nature of imposing a delay is indicated by delay block 113 being illustrated in dotted line format.

If charging is being conducted, method 100 proceeds via YES response line 116 to initiate cell balancing operations, as indicated by a block 118. Method 100 continues by terminating fast charging and enabling sampling of cell voltages, as indicated by a block 120. Method 100 proceeds by applying the at least one parametric criterion for identifying the respective cell balancing mode then extant; the respective cell balancing mode then extant being an extant cell balancing mode, as indicated by a Block 121. Block 121 includes a plurality of query blocks 122, 140, 158. Method 100 poses a query whether primary balancing is required (e.g., Region 3, FIG. 1), as indicated by a query block 122. If primary balancing is not required, method 100 proceeds via NO response line 138 to pose a query whether conditioning balancing is required (e.g., Region 1; FIG. 1), as indicated by a query block 140. If conditioning balancing is not required, method 100 proceeds via NO response line 156 to pose a query whether secondary balancing is required (e.g., Region 2; FIG. 1), as indicated by a query block 158. If secondary balancing is not required, method 100 proceeds via NO response line 172 to return via a return line 133 to carry out a fast charge operation for an interval, as indicated by a block 135. The interval during which a fast charge operation is carried out pursuant to block 135 may be a fixed interval or the interval may be a variable interval controlled by an operator or by a computer program based upon predetermined decision criteria. Details of control of the interval for fast charge operations carried out pursuant to block 135 are not illustrated in FIG. 6. Method 100 proceeds from block 135 after the interval associated with block 135 via a line 137 to return to block 120 to terminate fast charging and enable further voltage sampling.

Once the extant cell balancing mode is ascertained (block 121) method 100 employs the at least one charging variable (preferably charging current) for the extant cell balancing mode to effect a balancing operation appropriate to the conclusion drawn by block 121, as indicated by a block 123.

Thus, if it is determined that primary balancing is required, method 100 proceeds via YES response line 124 from query block 122 to pose a query whether the primary balance algorithm is enabled, as indicated by a query block 126. If the primary balance algorithm is enabled, method 100 proceeds via YES response line 128 to effect appropriate balancing (e.g., as described in connection with FIG. 5), as indicated by a block 130. If the primary balance algorithm is not enabled, method 100 proceeds via NO response line 136 to return via a return line 133 to carry out a fast charge operation for an interval, as indicated by block 135. The interval during which a fast charge operation is carried out pursuant to block 135 may be a fixed interval or the interval may be a variable interval controlled by an operator or by a computer program based upon predetermined decision criteria. Details of control of the interval for fast charge operations carried out pursuant to block 135 are not illustrated in FIG. 6. Method 100 proceeds from block 135 after the interval associated with block 135 via line 137 to return to block 120 to terminate fast charging and enable further voltage sampling.

If it is determined that conditioning balancing is required, method 100 proceeds via YES response line 142 from query block 140 to pose a query whether the conditioning balance algorithm is enabled, as indicated by a query block 144. If the conditioning balance algorithm is enabled, method 100 proceeds via YES response line 146 to effect appropriate balancing (e.g., as described in connection with FIG. 3), as indicated by a block 148. If the conditioning balance algorithm is not enabled, method 100 proceeds via NO response line 154 to return via return line 133 to carry out a fast charge operation for an interval, as indicated by block 135. The interval during which a fast charge operation is carried out pursuant to block 135 may be a fixed interval or the interval may be a variable interval controlled by an operator or by a computer program based upon predetermined decision criteria. Details of control of the interval for fast charge operations carried out pursuant to block 135 are not illustrated in FIG. 6. Method 100 proceeds from block 135 after the interval associated with block 135 via line 137 to return to block 120 to terminate fast charging and enable further voltage sampling.

If it is determined that secondary balancing is required, method 100 proceeds via YES response line 160 from query block 158 to pose a query whether the secondary balance algorithm is enabled, as indicated by a query block 162. If the secondary balance algorithm is enabled, method 100 proceeds via YES response line 164 to effect appropriate balancing (e.g., as described in connection with FIG. 4), as indicated by a block 166. If the secondary balance algorithm is not enabled, method 100 proceeds via NO response line 170 to return via return line 133 to carry out a fast charge operation for an interval, as indicated by block 135. The interval during which a fast charge operation is carried out pursuant to block 135 may be a fixed interval or the interval may be a variable interval controlled by an operator or by a computer program based upon predetermined decision criteria. Details of control of the interval for fast charge operations carried out pursuant to block 135 are not illustrated in FIG. 6. Method 100 proceeds from block 135 after the interval associated with block 135 via line 137 to return to block 120 to terminate fast charging and enable further voltage sampling.

Thus, in block 123, depending upon the balancing mode employed during charging (i.e., block 130, block 148 or block 166) for each selected cell (preferably selected cells include all cells in the battery array being charged) method 100 obtaining an extant parameter set; the extant parameter set being a measurement of at least one extant performance parameter of the at least one performance parameter associated with each the selected cell. Simply stated in the preferred embodiment of the method of the present invention, the cell voltage is measured as the extant parameter set. Method 100 continues, comparing each extant parameter set with the at least one exit criterion. Method 100 continues measuring the extant parameter set and comparing the extant parameter set with an appropriate exit criterion until the exit criterion is satisfied, as described in connection with FIG. 3 (conditioning balance; Region 1; FIG. 1), in connection with FIG. 4 (secondary balance; Region 2; FIG. 1) and in connection with FIG. 5 (primary balance; Region 3; FIG. 1).

When the appropriate exit criterion is satisfied, method 100 departs block 123 to return to query block 110 via a return line 114. A delay 113 may be if desired imposed in returning to query block 110. The optional nature of imposing a delay is indicated by delay block 113 being illustrated in dotted line format.

Thus, if method 100 is effecting primary balance (block 130) and the appropriate exit criterion is satisfied, method 100 returns via exit condition line 132 to return line 114. If method 100 is effecting conditioning balance (block 148) and the appropriate exit criterion is satisfied, method 100 returns via exit condition line 150 to return line 114. If method 100 is effecting secondary balance (block 166) and the appropriate exit criterion is satisfied, method 100 returns via exit condition line 168 to return line 114.

Alternatively, a time limit may be imposed for each cell balancing mode to establish a respective time out period as an additional exit criterion. In such a case, if the time out period expires, the cell balancing operation ceases for the then extant cell balancing mode regardless of whether the exit criterion has been met. Thus, if method 100 is effecting primary balance (block 130) and the appropriate time out period elapses, method 100 returns via time out line 134 to return line 114. If method 100 is effecting conditioning balance (block 148) and the appropriate time out period elapses, method 100 returns via time out line 152 to return line 114. In the preferred embodiment of the method of the present invention illustrated in FIG. 6, no time out parameter is provided for secondary balance (block 166) because it is in this secondary balancing operation (Region 2; FIG. 1) that balancing among cells is preferably to be carried out without interruption. A time out exit criterion could, of course, be incorporated into the secondary balance aspect of method 100 if desired.

Figure 7:
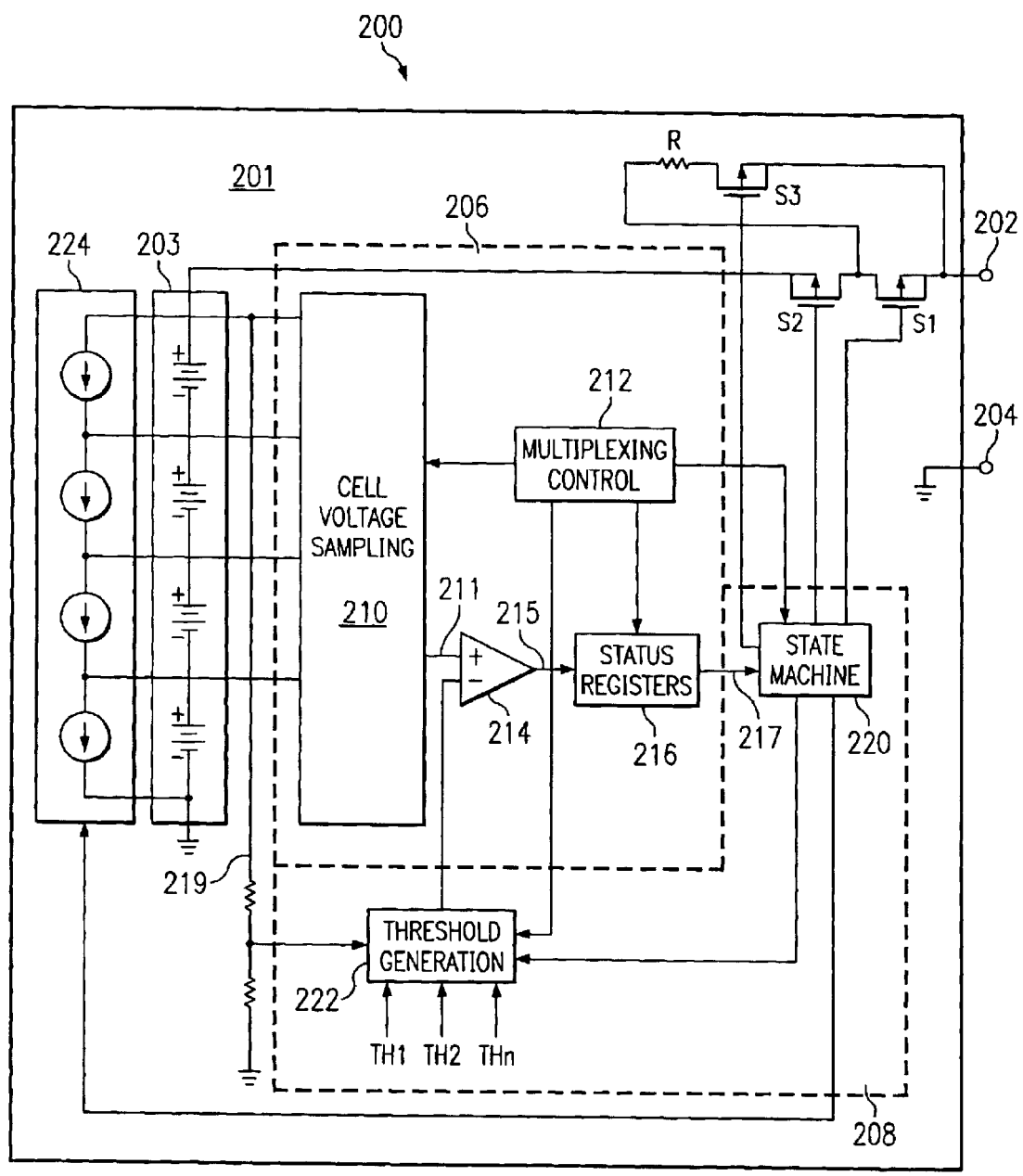
FIG. 7 is an electrical schematic diagram illustrating a first embodiment of the charging apparatus of the present invention.

FIG. 7 is an electrical schematic diagram illustrating a first embodiment of the cell balancing apparatus of the present invention. In FIG. 7, an apparatus 200 for controlling charging of a battery array 203 is situated on a substrate 201 and is configured for connection with a charging unit (preferably located off substrate 201; not shown in FIG. 7) at charger connectors 202, 204. Apparatus 200 includes a sensing unit 206 and a cell balancing control unit 208. Sensing unit 206 includes a cell voltage sampling device 210 coupled with battery array 203 for selectively sampling individual cells of battery array 203. Cell voltage sampling device 210 selectively converts respective cell voltages to ground-referenced values. Sensing unit 206 also includes a multiplexing control unit 212, a comparator 214 and a status register 216. Charge control unit 208 includes a state machine 220 and a threshold generation unit 222. Threshold generation unit 222 is provided with predetermined threshold values TH1, TH2, THn.

Multiplexing control unit 212 is coupled with cell voltage sampling device 210 for controlling which respective cell of battery array 203 is sampled by cell voltage sampling device 210. An output 211 from cell voltage sampling device 210 is provided to comparator 214 representing each sampling of a respective cell of battery array 203. Comparator 214 also receives an appropriate threshold value TH1, TH2, THn for the then extant cell balancing mode from threshold generation unit 222. The appropriate threshold value TH1, TH2, THn is selected by threshold generation unit 222 based upon a determination of which cell balancing mode is extant, which is in turn based upon cell voltage sampling results selectively provided from battery array 203, as chosen by cell voltage sampling device 210, to threshold generation unit 222 via a line 219.

Comparator 214 provides a comparing indication 215 to status register 216 indicating the result of comparing output 211 from cell voltage sampling unit 210 with the threshold value TH1, TH2, THn received from threshold generation unit 222.

Apparatus 200 is an analog/digital device preferably configured in a single-chip product. Cell voltage sampling 210 responds to signals from multiplexing control unit 212 in selecting respective cells in battery array 203 for sampling vis-à-vis a respective individual threshold value selected for each respective cell. The first digital manifestation of the test and comparison with the threshold is the comparing indication 215 provided to status register 216. Status register 216 provides an indication 217 to state machine 220 relating selected comparing indications 215 received from comparator 214. Multiplexing control unit 212 is coupled with cell voltage sampling unit 210, status register 216, state machine 220 and threshold generation unit 222 to ensure that the same respective cell of battery array 203 is dealt with at a given time by each of cell voltage sampling unit 210, status register 216, state machine 220 and threshold generation unit 222. Multiplexing control unit 212 may be a digital unit, an analog unit or a hybrid digital-analog unit that interfaces with digital state machine 220 and digital status registers 216. Preferably, cell voltage sampling unit 210, comparator 214 and threshold generation unit 222 are analog devices.

State machine 220 is coupled with a shunting unit 224 for selectively effecting slow charging of selected cells in battery array 203. An exemplary structure for effecting slower charging of selected cells in battery array 203 is shown in FIG. 7: shunting unit 224 establishes a current path for rerouting a portion of current around selected cells in battery array 203 to effect balancing among cells while charging. State machine 220 is also coupled with switching devices S1, S2, S3, and controls switching action of switching devices S1, S2, S3.

In summary, apparatus 200 uses thresholds TH1, TH2, THn to detect state of charge of respective cells of battery array 203. State machine 220 controls cooperation among sensing unit 206, control unit 208 and shunting unit 224 to effect cell sampling and balancing. Cell sampling and balancing are carried out either at zero charge current or at a conditioning current. In low capacity battery arrays (i.e., battery arrays having low charge), cell balancing takes place using a pre-conditioning current. The pre-conditioning current is a low current that permits balancing cells in the battery array without further depleting the battery array. In such conditions, cell impedance mismatch errors are present, but they are minimized by using a low pre-conditioning current. The minimal cell impedance mismatch errors are not regarded as critical in this charging mode because the main cell balancing operation is effected when the cells are at a higher capacity level.

In medium capacity battery arrays cell balancing is carried out at full charge current (sometimes referred to as fast charge current). The principal goal of such a cell balancing mode of operation is to minimize any cell imbalance increase that may be caused by charge-induced offsets among the respective cells of the battery array.

In high capacity battery arrays cell balancing is carried out with no charging current, or with a small charging current in order to achieve maximum performance and accuracy in charging operations.

Switch S2 controls current between switch S1 and battery array 203. Switch S1 controls current between charger locus 202 and switch S2. Switch S3 controls whether an impedance R is included in the circuitry. Impedance R is appropriately valued so that including impedance R into the circuitry of apparatus 200 provides a low current from charger locus 202 to battery array 203 when switch S1 is open, switch S2 is closed and Switch S3 is closed. The low current thus provided is appropriate for effecting charging when battery array is at a low capacity.

By way of example, apparatus 200 responds to state machine 220 and respective cell voltages in battery array 203 to effect charging operations (in cooperation with a charging device coupled to charger loci 202, 204; not shown in FIG. 7) as indicated in Table 1 below:

TABLE 1

|  | Switch S1 | Switch S2 | Switch S3 | |
|---|---|---|---|---|
| Low Capacity | Open | Closed | Closed | Charge Current Set by R |
| Medium Capacity | Closed | Closed | Open | Charge Current Set by Charger |
| High Capacity | Open | Closed | Closed | No Charge Current, or Charge Current Set by R |

Figure 8:
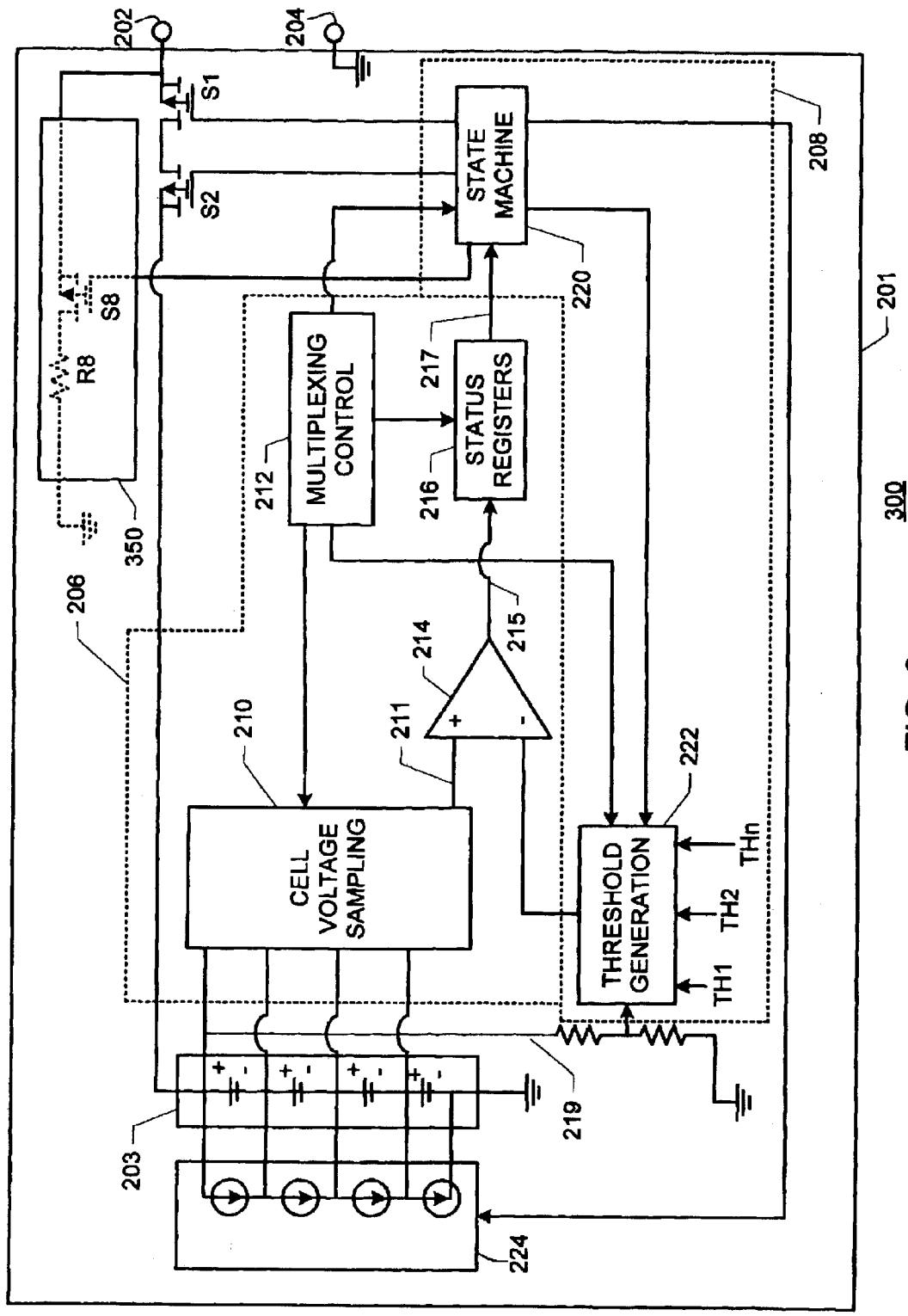
FIG. 8 is an electrical schematic diagram illustrating a second embodiment of the charging apparatus of the present invention.

FIG. 8 is an electrical schematic diagram illustrating a second embodiment of the charging apparatus of the present invention. In FIG. 8, an apparatus 300 is configured substantially the same as apparatus 200 (FIG. 7) for controlling charging of a battery array 203. In the interest of avoiding prolixity, a redundant description of apparatus 300 will not be undertaken; like components in apparatus 300 and apparatus 200 are identified using like reference numerals. This description of FIG. 8 will focus upon the differences between apparatus 300 and apparatus 200 (FIG. 7). The principal difference between apparatus 300 and apparatus 200 (FIG. 7) is in the provision of a current sink 350.

Current sink 350 is configured to ensure that a predetermined current continues to flow from a charger unit even when a low charge current condition (low capacity) or a no charge current condition (high capacity) exists in the battery array being charged. Current sink 350 may be embodied in any circuitry that selectively shunts a predetermined current to ground when apparatus 300 is effecting current balancing operations requiring certain levels of charging current. In the preferred embodiment of apparatus 300, the low current level required for effecting charging of a low capacity battery array 203 is provided by the charging unit itself, and the no current operation is accommodated by current sink 350. In the preferred embodiment, current sink 350 provides a predetermined current draw from the charging unit sufficient that the charging unit does not detect a no current situation and prematurely erroneously terminate charging operations.

The preferred embodiment of current sink 350 is illustrated in FIG. 8 in dotted line format. A switch S8 responsive to state machine 220 selectively includes an impedance R8 within the circuitry of apparatus 300 to shunt current to ground from the charging unit (not shown in FIG. 8) coupled with charging loci 202, 204. Impedance R8 is selected appropriately to ensure that sufficient current is drawn from the charging unit to preclude inappropriate premature termination of charging operations by the charging unit. No communication is required between the host unit being charged (not shown in FIG. 8) or between apparatus 300 and the charging unit. The inclusion of current sink 350 within the circuitry of apparatus 300 is effected in response to the cell balancing mode selected for charging battery array 203 based upon comparison of cell voltages with thresholds TH1, TH2, THn, as described earlier herein in connection with FIGS. 1–7.

In summary, apparatus 300 uses fixed thresholds TH1, TH2, THn to detect state of charge of battery array 203. State machine 220 controls cooperation among sensing unit 206, control unit 208 and shunting unit 224 to effect cell sampling and balancing. Cell sampling and balancing are carried out either at zero charge current or at a conditioning current. In low capacity battery arrays (i.e., battery arrays having low charge), cell balancing takes place using a pre-conditioning current. The pre-conditioning current is a low current set by the charging unit (not shown in FIG. 8) that permits balancing cells in the battery array without further depleting the battery array. In such conditions, cell impedance mismatch errors are present, but they are minimized by using a low pre-conditioning current. The minimal cell impedance mismatch errors are not regarded as critical in this cell balancing mode because the main cell balancing operation is effected when the cells are at a higher capacity level.

In medium capacity battery arrays cell balancing is carried out at full charge current. The principal goal of such a cell balancing mode of operation is to minimize any cell imbalance increase that may be caused by charge-induced offsets among the respective cells of the battery array.

In high capacity battery arrays cell balancing is preferably carried out with a small charging current established by current sink 350 in order to achieve maximum performance and accuracy in charging operations. Current sink 350 preferably ensures that a sufficient load is "seen" by a charger unit (not shown in FIG. 8). This avoids interruption of charging operations which might otherwise occur if the charger unit erroneously "saw" a too-low load and interpreted that too-low load as indicating a completion of charging.

Switch S2 controls current between switch S1 and battery array 203. Switch S1 controls current between charger locus 202 and switch S2. Switch S8 controls whether an impedance R8 is included in the circuitry to draw a predetermined current from the charging unit and shunt to ground. Impedance R8 is appropriately valued so that including impedance R8 into the circuitry of apparatus 300 provides a low current from charger locus 202 to ground when switch S1 is open, switch S2 is closed and switch S8 is closed. The low current thus drawn from charging locus 202 is appropriate to preclude premature erroneous termination of charging operations by the charging unit.

By way of example, apparatus 300 responds to state machine 220 and respective cell voltages in battery array 203 to effect charging operations (in cooperation with a charging device coupled to charger loci 202, 204; not shown in FIG. 8) as indicated in Table 2 below:

TABLE 2

|  | Switch S1 | Switch S2 | Switch S8 | |
|---|---|---|---|---|
| Low Capacity | Closed | Closed | Open | Charge Current Set by Charger |
| Medium Capacity | Closed | Closed | Open | Charge Current Set by Charger |
| High Capacity | Open | Closed | Closed | No Charge Current; Predetermined Current Drawn From Charger |

Apparatus 300 does not require communication between apparatus 300 (or a host product for which apparatus 300 is controlling cell balancing operations) and the charger unit (not shown in FIG. 8) coupled with charger loci 202, 204. The charger unit does not require information regarding when low current charging operations or no current charging operations are being carried out. The inclusion of current sink 350 within the circuitry of apparatus 300 is effected in response to the cell balancing mode selected for charging battery array 203 based upon comparison of cell voltages with thresholds TH1, TH2, THn, as described earlier herein in connection with FIGS. 1–7.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. An apparatus for use with a charge control system for affecting current draw from a charging unit coupled at an input locus of said charge control system for charging a battery unit of at least one cell; the apparatus comprising a current sink switchingly coupled with said input locus for selectively contributing a predetermined current draw at said input locus and changing the cell balance in accordance with a position in the charging cycle.

2. An apparatus for use with a charge control system for affecting current draw from a charging unit coupled at an input locus of said charge control system for charging a battery unit as recited in claim 1 wherein said current sink comprises at least one impedance device.

3. An apparatus for use with a charge control system for affecting current draw from a charging unit coupled at an input locus of said charge control system for charging a battery unit as recited in claim 2 wherein said at least one impedance device is arranged for said switching coupling in at least one impedance unit; each said at least one impedance unit including at least one said impedance device.

4. An apparatus for use with a charge control system for affecting current draw from a charging unit coupled at an input locus of said charge control system for charging a battery unit as recited in claim 2 wherein said at least one impedance device is at least one resistor.

5. An apparatus for use with a charge control system for affecting current draw from a charging unit coupled at an input locus of said charge control system for charging a battery unit as recited in claim 2 wherein said at least one impedance device is at least one resistor.

6. An apparatus for use with a charge control system for affecting current draw from a charging unit coupled at an input locus of said charge control system for charging a battery unit as recited in claim 3 wherein said at least one impedance device is at least one resistor.

7. An apparatus for selectively establishing a predetermined current draw from a charging unit coupled with a charge control unit for charging a battery unit of at least one cell; said charging unit being coupled with said charge control unit at an input locus; the apparatus comprising at least one resistor and at least one switch unit coupled between said input locus and ground; said at least one switch unit opening and closing in response to said charge control unit to establish said predetermined current draw when predetermined conditions are sensed in said battery unit and changing the cell balance in accordance with a position in the charging cycle.

8. An apparatus for selectively establishing a predetermined current draw from a charging unit coupled with a charge control unit for charging a battery unit as recited in claim 7 wherein said at least one resistor comprises one resistor.

9. An apparatus for selectively establishing a predetermined current draw from a charging unit coupled with a charge control unit for charging a battery unit as recited in claim 7 wherein said at least one resistor and said at least one switch are arranged for switchingly coupling at least one impedance unit between said input locus and ground; each said at least one impedance unit including at least one said at least one resistor.

10. A method for selectively establishing a predetermined current draw from a charging unit coupled at an input locus with a charge control unit for charging a battery unit of at least one cell; the method comprising the steps of:

(a) providing a current sink switchingly coupled with said input locus;

(b) sensing at least one predetermined condition in said battery unit; and (c) switchingly engaging said current sink when said at least one predetermined condition satisfies at least one predetermined criteria and changing the cell balance in accordance with a position in the charging cycle.

11. A method for selectively establishing a predetermined current draw from a charging unit coupled at an input locus with a charge control unit for charging a battery unit as recited in claim 10 wherein said current sink comprises at least one impedance device.

12. A method for selectively establishing a predetermined current draw from a charging unit coupled at an input locus with a charge control unit for charging a battery unit as recited in claim 11 wherein said at least one impedance device is arranged for said switchingly engaging at least one impedance unit; each said at least one impedance unit including at least one said impedance device.

13. A method for selectively establishing a predetermined current draw from a charging unit coupled at an input locus with a charge control unit for charging a battery unit as recited in claim 11 wherein said at least one impedance device is at least one resistor.

14. A method for selectively establishing a predetermined current draw from a charging unit coupled at an input locus with a charge control unit for charging a battery unit as recited in claim 11 wherein said at least one impedance device is at least one resistor.

15. A method for selectively establishing a predetermined current draw from a charging unit coupled at an input locus with a charge control unit for charging a battery unit as recited in claim 12 wherein said at least one impedance device is at least one resistor.

* * * * *